United States Patent [19]

Blume

[11] Patent Number: 4,489,324

[45] Date of Patent: Dec. 18, 1984

[54] LOW SIDELOBE PHASED ARRAY ANTENNA SYSTEM

[76] Inventor: Alan E. Blume, 5866 Shady Cove, Trotwood, Ohio 45426

[21] Appl. No.: 445,639

[22] Filed: Nov. 30, 1982

[51] Int. Cl.³ .......................... H01Q 3/22; H01Q 3/24; H01Q 3/26
[52] U.S. Cl. ..................................... 343/372; 343/379
[58] Field of Search ............... 343/368, 371, 372, 379, 343/853

[56] References Cited

U.S. PATENT DOCUMENTS 3,182,325 5/1965 Blume .................................. 343/379

4,318,104 3/1982 Enein .................................. 343/372

Primary Examiner—Eli Lieberman

[57] ABSTRACT

In a pulse radar system, wide angle sidelobes are reduced considerably in a phased array antenna by advancing each digital phase shifter by one bit just before each radar pulse is transmitted. This advance maintains the linear phase slope of the antenna elements as the difference in phase between adjacent elements is uniform, thereby having little effect on the antenna's main beam. However, the radar return signals from the sidelobes are reduced in comparison to the main beam return due to the radar receiver's integration process.

5 Claims, 3 Drawing Figures

LOW SIDELOBE PHASED ARRAY ANTENNA SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to a phased array antenna system and more particularly to a phased array antenna system which can effectively exhibit an antenna pattern with very low sidelobes.

It is known in the art that the performance of steerable phased array antenna systems is largely dependent upon the characteristics of the phase shifters incorporated in such an antenna system. That is, the type of phase shifters used, variations between such devices due to different ambient temperature and operating frequencies, and small variations caused by manufacturing tolerances combine to limit the overall accuracy of the antenna system. This erratic performance of the phase shifters can result in the wide angle sidelobes increasing considerably in amplitude as compared to their theoretical value. With increased sidelobes, the danger exists that the radar system will detect an erroneous target through a sidelobe rather than the intended target via the main beam. Integration of the returned echo pulses for stable targets does not solve the problem with respect to phase as all phase shifters have heretofore been fixed for a sequence of pulses which are integrated in order to maintain precision with respect to the main beam's direction.

Prior work in this area includes U.S. Pat. No. 3,412,405 to Crotty et al which discloses a system for reducing the sidelobe response of a receiving antenna which continuously shifts the phase center of the antenna. Also, U.S. Pat. No. 4,308,539 to Birch shows a phased array antenna wherein the drive to each one of a plurality of phase shifters is changed to compensate for changes in operating conditions. While each of these patents is suitable for their intended purpose, neither invention effectively reduces the sidelobes in a phased array antenna system in order to easily distinguish a main beam response from a sidelobe re- sponse.

SUMMARY OF THE INVENTION

It is therefore an object of this invention to provide an improved phased array antenna system with reduced sidelobes.

Another object of this invention is to provide an improved phased array antenna system capable of reducing detection of stable targets which are located at wide angles from the main beam.

According to the invention, a pulse radar system is described having a transmitter, receiver, and a phased array antenna including a plurality of digital phase shifters. Each digital phase shifter setting is advanced by one bit just before each radar pulse is transmitted. This advance maintains the linear phase slope from the antenna elements, as the difference in phase between adjacent elements is uniform thereby having little effect on the antenna's main beam. Wide angle sidelobes, however, will vary considerably in phase and magnitude. The integration of the radar returns from a series of pulses reduces the sidelobe returns from a stable target in comparison to the main beam returns.

DETAILED DESCRIPTION OF THE INVENTION

Figure 1:
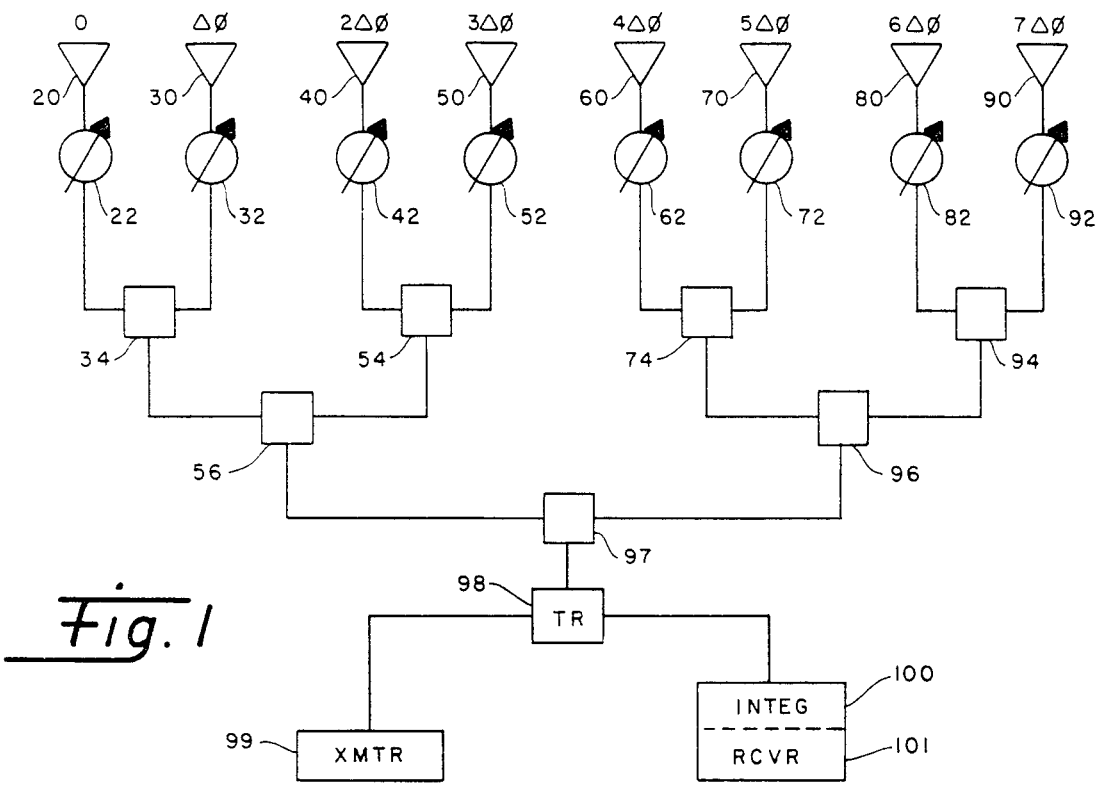
FIG. 1 is a block diagram of a typical phased array antenna system used in conjunction with a pulsed radar set.

Referring to FIG. 1, a typical corporate-fed phased array antenna system which can be used for both transmitting and receiving is shown with eight radiating or receiving elements. These elements, for example open ended waveguides, are designated 20, 30, 40, 50, 60, 70, 80 and 90. Each element is connected, respectively, to a digital phase shifter 22, 32, 42, 52, 62, 72, 82 and 92. Phase shifters 22 and 32 are connected by a hybrid 34, typically a Magic Tee power combiner, which produces a summation type output signal for received signals from the peak of the main beam. Phase shifters 42 and 52 are also connected by an identical hybrid 54 to produce an output signal which is the sum of the two input signals. Likewise, phase shifters 62 and 72 are connected via hybrid 74, while phase shifters 82 and 92 are connected via hybrid 94. The output signals of hybrids 34 and 54 are then combined in a hybrid 56 to produce another sum output signal while the signals from hybrid 74 and hybrid 94 are combined in hybrid 96 also to produce an output signal. The signals from hybrid 56 and 96 are then combined in hybrid 97 to produce an output signal which is essentially the sum of all signals from the peak of the main beam received from the antenna elements. Signals received from other than the main beam peak direction are attenuated but, in general, are not completely cancelled. The output from hybrid 97 is then fed into a radar set for signal processing. With a received signal, the output of hybrid 97 is fed into an integrator in order to integrate the received signals over a period of time. Normally, the output from hybrid 97 is fed into a TR switch 98 which changes the connections of the circuit to connect either a transmitter 99 or a receiver 101 via an integrator 100, depending on the mode of operation of the radar. The integrator, coupled in the receiver, performs the summation of returned signals over a particular dwell time. Integration is well known in the art and is described in M. Skolnik, *Introduction to Radar Systems*, McGraw-Hill, 1962, p35–40.

Although not shown in the figure, amplification is often used in conjunction with each individual phase shifter for both preamplification on receive, and power amplification or transmit. This requires a pair of TR switches for each element.

The digital phase shifters can be either conventional ferrite or diode type phase shifters. Each phase shifter is composed of a plurality of phase bits, each of which operates to produce two different phase settings. By adjusting the bit settings, the total delay is varied and hence the phase change produced by the phase shifter. The totality can produce phase shifts generally from zero to approximately one wavelength.

Figure 2:
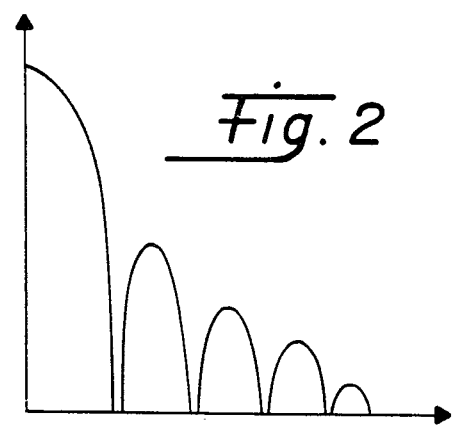
FIG. 2 is a typical antenna pattern produced from a prior art phased array antenna system.

The phased array antenna system of FIG. 1 will exhibit an antenna pattern like that found in FIG. 2. The magnitude of of the main beam is displayed along the y-axis with successively smaller beams shown along the x-axis. The scale along the x-axis represents the angle off the boresight of the antenna. It is desirable to have the sidelobes as low as possible to minimize the effect of signals from other than the main beam direction. In a typical airborne application, the main beam is 2°-3° with the close in sidelobes 30 db down from the main beam peak and wide angle sidelobes 40-60 db down from the main beam peak.

Each phase shifter produces a signal which results in a different phase component for each element and which determines the direction of the main beam. It is the difference in phase between adjacent elements that is important for the present invention. The present invention specifies that each phase shifter setting is advanced one bit just before each radar pulse is transmitted. Preferably, the phase shifters are advanced through all of their possible settings, e.g. through 32 steps for 5 bit phase shifters, in which case 32 pulses are integrated. With each phase shifter advancing, the output of each changes in phase from the prior output, but the difference in phase between adjacent elements remain the same. In this manner the uniform phase slope across the elements remains constant. The peak of the main beam will be affected very little in magnitude, phase or direction by tolerances which affect the wide angle sidelobes considerably. A discussion of this can be found in Jasik, H., *Antenna Engineering Handbook,* McGraw-Hill, 1961, page 2-36 to 2-41. The peak of the main beam direction is determined by the uniform phase slope across the array of elements. The uniform phase slope can be viewed in FIG. 1 at the top of the antenna elements. The phase of the waveform associated with each element is increased by an incremental amount $\Delta\phi$, with the actual numerical value of the phase setting being different from each other. Thus, assume a $\Delta\phi$ of $-45°$ for a given beam direction and the original phase setting for element 20 was 0°, and the setting for element 30 is $-45°$, with $-90°$ for element 40. Then the phase shifters could be shifted by an incremental amount of $-45°$ and still retain a uniform phase slope. Then, the setting for element 20 would be $-45°$, for element 30 the setting would be $-90°$, and for element 40 the setting would be $-135°$.

Figure 3:
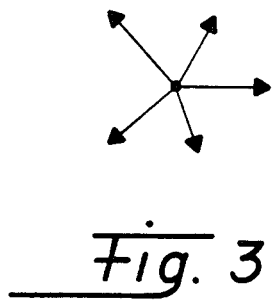
FIG. 3 is a phasor diagram of radar return signal from sidelobes according to the preferred embodiment.

The wide angle sidelobes will in general vary considerably in magnitude and phase after each change in phase setting because of the change in phase shifter tolerances. The integration of the returns from a series of pulses during a dwell time will reduce the sidelobe returns from coherent targets (targets whose characteristics do not change appreciably during the time intervals under consideration) in comparison to the main beam returns. The variation in phase for the sidelobes is primarily random and results from the different phase settings employed. FIG. 3 shows phasors representing the wide angle returns arranged in a random sequence to indicate the wide variations in phase. The integration process essentially performs a phasor summation and reduces the multiple phasor diagram to a single phasor of significantly smaller magnitude. It is this integration process that results in the low sidelobes at wide angles. Tolerances of individual phase shifters vary from one to another, and also change for each one as its setting is changed. This is because different bit elements are then used. Thus when successive pulses are integrated the errors tend to cancel out.

Thus, while preferred constructional features of the invention are embodied in the structure illustrated herein, it is to be understood that changes and variations may be made by the skilled in the art without departing from the spirit and scope of the invention. Particularly, it is to be understood that the invention is not limited to structures utilizing a linear phase slope but could be applied to structures using a non-linear phase slope in certain circumstances. In addition, it should be noted that although digital phase shifters have been referred to, analog phase shifters can be used in a similar manner by systematically stepping the phases of all the phase shifters.

I claim:

1. In a pulse radar system having a transmitter, receiver and phased array antenna, said phased array antenna comprising:
    a digital phase shifter with each of a plurality of radiating elements of said antenna in a common path of electromagnetic energy for both transmitting and receiving, said digital phase shifters set to produce a linear slope phase front in which the phase difference between adjacent elements is equal in order to orient the antenna's main beam in a given direction; said radar system further including an integration means in said receiver which sums a sequence of radar return signals over a particular dwell time to average any received noise while enhancing the desired target signal; and
    means for advancing each phase shifter setting by one bit just before each radar pulse is transmitted whereby the slope of the phase front remains constant so that the direction of the main beam remains fixed while wide angle sidelobes are reduced by the integration means.

2. The apparatus of claim 1, wherein each phase shifter comprises n bits, and the number of pulses in said sequence is equal to 2 to the nth power.

3. In a pulse radar system having a transmitter, receiver and phased array antenna, said phased array antenna comprising:
    a phase shifter with each of a plurality of radiating elements of said antenna in a common path of electromagnetic energy for both transmitting and receiving, said phase shifters set to produce a desired phase front in which the phase difference between adjacent elements is in a predetermined relationship in order to orient the antenna's main beam in a given direction; said radar system further including an integration means in said receiver which sums a sequence of radar return signals over a particular dwell time to average any received noise while enhancing the desired target signal;
    means for adjusting each phase shifter setting just before each radar pulse is transmitted whereby each phase shifter is adjusted an equal amount so that the direction of the main beam remains fixed while wide angle sidelobes are reduced by the integration means.

4. The apparatus of claim 3, wherein said phase shifter includes a digital phase shifter and wherein said equal amount being at least a one bit adjustment of said digital phase shifter.

5. The apparatus of claim 3, wherein said predetermined relationship is a linear relationship producing a linear phase front.

* * * * *